July 2, 1929.　　　　H. D. GEYER　　　　1,719,008
STEERING WHEEL
Filed Oct. 6, 1925

Inventor
Harvey D. Geyer
By Spencer Sewall Hardman
his Attorneys

Patented July 2, 1929.

1,719,008

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

STEERING WHEEL.

Application filed October 6, 1925. Serial No. 60,752.

This invention relates to the construction of spiders for handwheels, especially such as are ordinarily used for steering wheels on automotive vehicles.

An object of this invention is to provide a spider made up from a hub casting and pressed metal spokes in such a way that a single shaping die may be used for making the pressed metal spokes for various sized wheels.

Automotive steering wheels vary in size, usually between 17 inch diameter and 22 inch diameter. Heretofore when pressed metal spokes have been used in the spiders a separate shaping die has been necessary for forming the spokes for each size of steering wheel. By this invention the inner ends of the spokes are given such shape that the same shaping die may be used for making spokes of various lengths simply by cutting off the inner end of the spoke to give the spoke the desired length.

Further objects and advantages of the present invention will be apparent from the following description, reference being had to the accompanying drawings, wherein a preferred form of embodiment of the present invention is clearly shown.

In the drawings.

Similar reference characters refer to similar parts in the several views.

Figure 1:
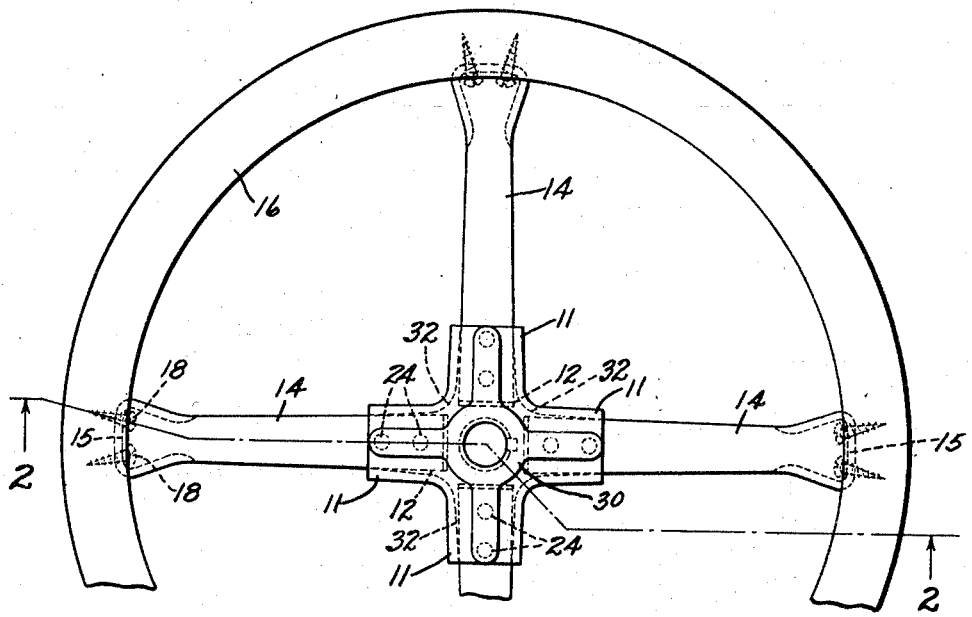
Fig. 1 is a plan view of an automobile steering wheel built according to this invention.

Reference numeral 10 denotes the malleable iron hub casting which has four stub arms 11 projecting therefrom. Each of the stub arms 11 is provided with a rectangular shaped recess 12 which is adapted to receive the correspondingly shaped inner ends 13 of the spider spokes 14.

These spokes 14 are stamped out from flat metal, preferably steel, and have outer ends 15 shaped to conform to the curvature of the wood rim 16. The two short side flanges 17 on each spoke strengthen the bent-back outer end 15 and also conceal the screws 18 which fasten the spoke to the rim. The slightly tapering main portion of spokes 14 is dished, as clearly shown in Fig. 2, while the inner ends 13 are turned to lie parallel to the plane of the rim 16. When the spokes are first formed in the shaping die, according to a manner well known to those skilled in the art, the flat inner spoke ends 13 of uniform section are extended to such length (shown by the dot and dash line 20 in Fig. 3) as will be required for the largest wheel to be made with that particular shaping die, say for instance a 20 inch wheel. If now it is desired to make a smaller diameter wheel with spokes formed in this same die, it is only necessary to cut off such length of the inner end 13 as to give the desired diameter wheel. For instance, by cutting off each spoke at the line 21 a 19 inch diameter wheel will be obtained, and by cutting off each spoke at the line 22 (shown in full in Fig. 3) an eighteen inch diameter wheel will be obtained. Of course the holes 23 for the rivets 24 will have to be located according to the length of spoke to be used. It will be noted that since the inner ends 13 are of constant width and thickness from the bend 25 to the line 20 (see Fig. 3) that regardless of where the spoke is cut off, as described above, the resultant inner end will accurately fit the recesses 12 in the hub casting.

Figure 2:
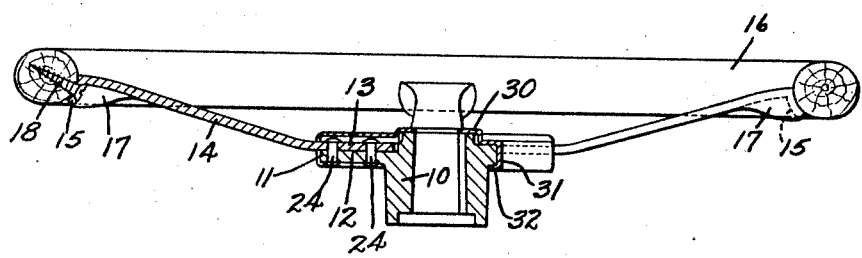
Fig. 2 is a section on line 2—2 of Fig. 1.
Figure 3:
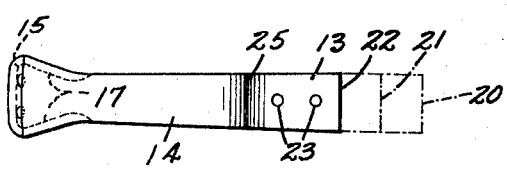
Fig. 3 is a plan view of an individual pressed metal spoke and shows in dot and dash lines the full length of the spoke made in the shaping die.

A relatively thin sheet aluminum top cover plate 30 conceals the entire hub and the inner ends of the spokes, as clearly shown in Figs. 1 and 2, and thus provides a neat appearance to the central portion of the spider. This cover plate 30 is provided with depending flanges 31 which cover the lateral surfaces of the stub arms 11. The flanges 31 are turned under the stub arms 11, as shown at 32 in Figs. 1 and 2, and thus firmly secure the cover plate in position.

While the form of embodiment of the present invention as herein disclosed, constitutes a preferred form, it is to be understood that other forms might be adopted, all coming within the scope of the claims which follow.

What is claimed is as follows:

1. An all metal built-up handwheel spider comprising, a main hub casting having radially projecting stub arms integral therewith, each of said stub arms having a rectangular radial recess therein open at the top, separately formed pressed metal spokes having straight radial inner portions of uniform width fitting snugly within said open top recesses and adapted to be cut off to reduce their length without change of shape of the inner end portion thereof, each of said spokes being rigidly fixed to its stub arm by a plurality of radially spaced rivets, and a relatively thin decorative pressed metal top cover plate having flanges bent down around and concealing said stub arms and the inner ends of said spokes.

2. An all metal built-up handwheel spider comprising, a main hub casting having radially projecting stub arms integral therewith, each of said stub arms having a radial recess therein of uniform width and open at the top, separately formed pressed metal spokes having specially formed pads on their outer ends and straight radial inner portions of uniform width fitting snugly within said open top recesses and adapted to be cut off without change of shape of their inner ends, rivets passing through the inner ends of said spokes and said stub arms for rigidly securing the spokes to the hub, and a relatively thin decorative pressed metal top cover plate having portions bent down around and concealing said stub arms and inner ends of said spokes, said top cover plate having a decorative raised bead therein to provide clearance for the upper heads of said rivets.

In testimony whereof I hereto affix my signature.

HARVEY D. GEYER.